(12) United States Patent
Kasahara et al.

(10) Patent No.: US 9,092,058 B2
(45) Date of Patent: Jul. 28, 2015

(54) INFORMATION PROCESSING APPARATUS, INFORMATION PROCESSING METHOD, AND PROGRAM

(75) Inventors: Shunichi Kasahara, Kanagawa (JP); Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 13/074,806

(22) Filed: Mar. 29, 2011

(65) Prior Publication Data

US 2011/0242029 A1 Oct. 6, 2011

(30) Foreign Application Priority Data

Apr. 6, 2010 (JP) ................... P2010-087854

(51) Int. Cl.
| | | |
|---|---|---|
| G06F 3/01 | (2006.01) | |
| G06F 3/041 | (2006.01) | |
| G06F 3/044 | (2006.01) | |
| G06F 3/0486 | (2013.01) | |
| G06F 3/0488 | (2013.01) | |

(52) U.S. Cl.
CPC ............... *G06F 3/016* (2013.01); *G06F 3/044* (2013.01); *G06F 3/0414* (2013.01); *G06F 3/0416* (2013.01); *G06F 3/0486* (2013.01); *G06F 3/04883* (2013.01); *G06F 3/04886* (2013.01); *G06F 2203/04106* (2013.01); *G06F 2203/04808* (2013.01)

(58) Field of Classification Search
CPC ..... G06F 3/016; G06F 3/0414; G06F 3/0416; G06F 3/044; G06F 3/0486; G06F 3/04883; G06F 3/04886; G06F 2203/04106; G06F 2203/04808

USPC .................. 345/173, 174, 175, 176, 177; 178/18.03–18.09; 715/863, 864

See application file for complete search history.

(56) References Cited

U.S. PATENT DOCUMENTS

| | | | |
|---|---|---|---|
| 6,392,638 B2* | 5/2002 | Hanajima et al. ............. | 345/173 |
| 6,492,979 B1* | 12/2002 | Kent et al. ..................... | 345/173 |
| 6,504,530 B1* | 1/2003 | Wilson et al. ................. | 345/173 |
| 7,133,026 B2* | 11/2006 | Horie et al. ................... | 345/163 |
| 7,456,823 B2* | 11/2008 | Poupyrev et al. ............. | 345/173 |
| 7,969,412 B2* | 6/2011 | Nagiyama et al. ............ | 345/156 |
| 8,274,484 B2* | 9/2012 | Baudisch et al. ............. | 345/173 |
| 8,385,885 B2* | 2/2013 | Hainzl .......................... | 455/411 |
| 2005/0225538 A1* | 10/2005 | Verhaegh ...................... | 345/173 |
| 2007/0188473 A1* | 8/2007 | Anwar .......................... | 345/173 |
| 2008/0204427 A1* | 8/2008 | Heesemans et al. ......... | 345/174 |
| 2009/0009482 A1* | 1/2009 | McDermid .................... | 345/173 |
| 2009/0033632 A1* | 2/2009 | Szolyga et al. ............... | 345/173 |
| 2009/0066660 A1* | 3/2009 | Ure ................................ | 345/173 |
| 2009/0160793 A1* | 6/2009 | Rekimoto ..................... | 345/173 |
| 2009/0256809 A1* | 10/2009 | Minor ........................... | 345/173 |
| 2009/0303187 A1* | 12/2009 | Pallakoff ....................... | 345/169 |
| 2010/0053116 A1* | 3/2010 | Daverman et al. ............ | 345/175 |

(Continued)

FOREIGN PATENT DOCUMENTS

JP     11-203044     7/1999

*Primary Examiner* — Tom Sheng
(74) *Attorney, Agent, or Firm* — Sherr & Jiang, PLLC

(57) ABSTRACT

An apparatus is disclosed. The apparatus may include a touch panel configured to detect a position of a user input. The apparatus may also include a force sensor physically separated from the touch panel and configured to detect a magnitude of a force. Additionally, the apparatus may include a controller configured to determine an operation based on the detected position and the detected magnitude.

21 Claims, 17 Drawing Sheets

(56) References Cited

U.S. PATENT DOCUMENTS

| | | | |
|---|---|---|---|
| 2010/0088654 A1* | 4/2010 | Henhoeffer | 715/863 |
| 2010/0099394 A1* | 4/2010 | Hainzl | 455/418 |
| 2010/0134424 A1* | 6/2010 | Brisebois et al. | 345/173 |
| 2010/0194682 A1* | 8/2010 | Orr et al. | 345/156 |
| 2010/0250071 A1* | 9/2010 | Pala et al. | 701/48 |
| 2011/0018695 A1* | 1/2011 | Bells et al. | 340/407.2 |
| 2011/0050576 A1* | 3/2011 | Forutanpour et al. | 345/168 |
| 2011/0080349 A1* | 4/2011 | Holbein et al. | 345/173 |
| 2011/0080350 A1* | 4/2011 | Almalki et al. | 345/173 |
| 2011/0141052 A1* | 6/2011 | Bernstein et al. | 345/174 |
| 2011/0148774 A1* | 6/2011 | Pihlaja | 345/173 |
| 2011/0167391 A1* | 7/2011 | Momeyer et al. | 715/863 |
| 2012/0068946 A1* | 3/2012 | Tang et al. | 345/173 |
| 2012/0105358 A1* | 5/2012 | Momeyer et al. | 345/174 |
| 2012/0146945 A1* | 6/2012 | Miyazawa et al. | 345/174 |

* cited by examiner

INFORMATION PROCESSING APPARATUS, INFORMATION PROCESSING METHOD, AND PROGRAM

CROSS-REFERENCE TO RELATED APPLICATION

This application claims priority of Japanese Patent Application No. 2010-087854, filed on Apr. 6, 2010, the entire content of which is hereby incorporated by reference.

BACKGROUND

1. Technical Field

The present disclosure relates to an information processing apparatus, an information processing method, and a program, and in more detail to an information processing apparatus equipped with a position sensor and a pressure sensor and an information processing method, and a program for the same.

2. Description of the Related Art

Touch panels are capable of realizing intuitive and easy-to-use user interfaces, and have been conventionally used in ticket machines for means of transport, in bank ATMs, and the like. In recent years, touch panels have also become able to detect user operations, making it possible to realize appliance operations that could not be performed with conventional button operations. For this reason, in recent years, touch panels have come into widespread use in mobile appliances such as mobile telephones and game consoles.

As one example, Japanese Laid-Open Patent Publication No. H11-203044 discloses an information processing system that detects a pressed position on a touch panel and a pressing force on the touch panel and carries out processing in accordance with the pressed position and the pressing force. By doing so, it is possible to realize a greater variety of operations on a touch panel.

However, as described in Publication No. H11-203044, a touch panel is normally disposed close to a display. In a touch panel constructed in this way, when the user carries out a pressing operation where the user presses the touch panel with his/her finger, a large load is applied to the display. This means that for operations that use a touch panel, there are problems regarding hardware constraints and durability.

There are further issues relating to pressing operations on a touch panel in that it is difficult for a user to recognize the extent of the pressing (i.e., whether the screen has been pressed sufficiently strongly) and that some operations, such as when the user moves his/her finger while pressing the touch panel, are tiring for the user.

SUMMARY

Accordingly, there is disclosed an apparatus which includes a touch panel, a force sensor, and a controller. The touch panel may be configured to detect a position of a user input. And the force sensor may be physically separated from the touch panel and configured to detect a magnitude of a force. The controller may be configured to determine an operation based on the detected position and the detected magnitude.

There is also disclosed a method of determining an operation to be performed by an apparatus. A processor may execute a program to cause the apparatus to perform the method. The program may be stored on a computer-readable medium. The method may include detecting, with a touch panel of the apparatus, a position of a user input. The method may also include detecting, with a force sensor of the apparatus that is physically separated from the touch panel, a magnitude of a force. Additionally, the method may include determining the operation based on the detected position and the detected magnitude.

BRIEF DESCRIPTION OF THE DRAWINGS

FIG. 14 is a flowchart showing an operation execution judging process carried out by the information processing apparatus according to the present embodiment to decide an operation process executed in accordance with the way in which a load is applied, movement of the indicated position, and the like;

FIG. 15 is a diagram useful in explaining an operation process executed in accordance with the way in which a load is applied, movement of the indicated position, and the like;

DETAILED DESCRIPTION

Figure 1:
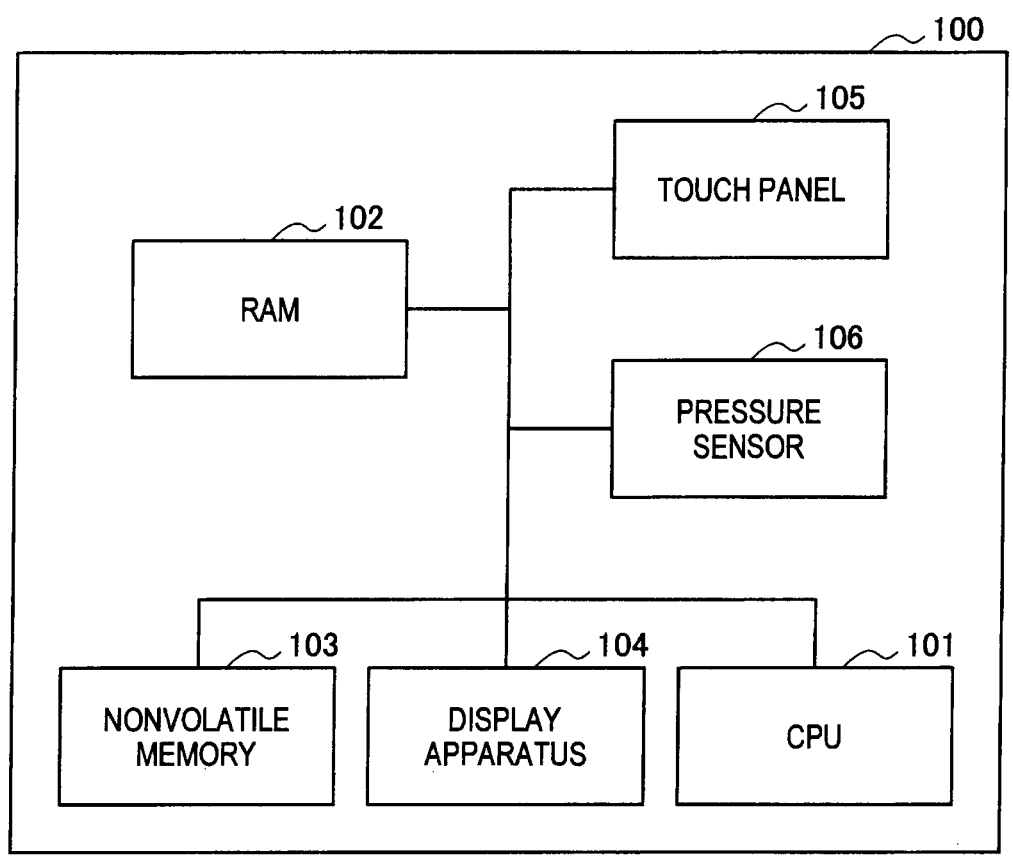
FIG. 1 is a block diagram showing an example hardware configuration of an information processing apparatus consistent with an embodiment of the present invention.

Hereinafter, embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
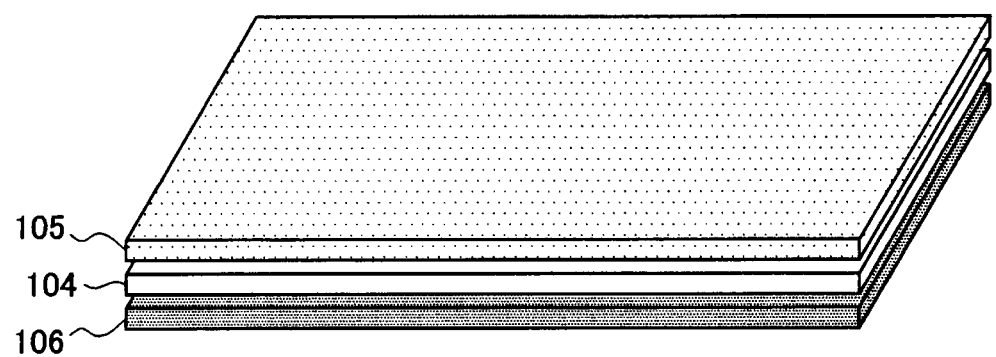
FIG. 2 is a diagram useful in showing one example of a hardware configuration of an information processing apparatus according to the same embodiment.
Figure 3:
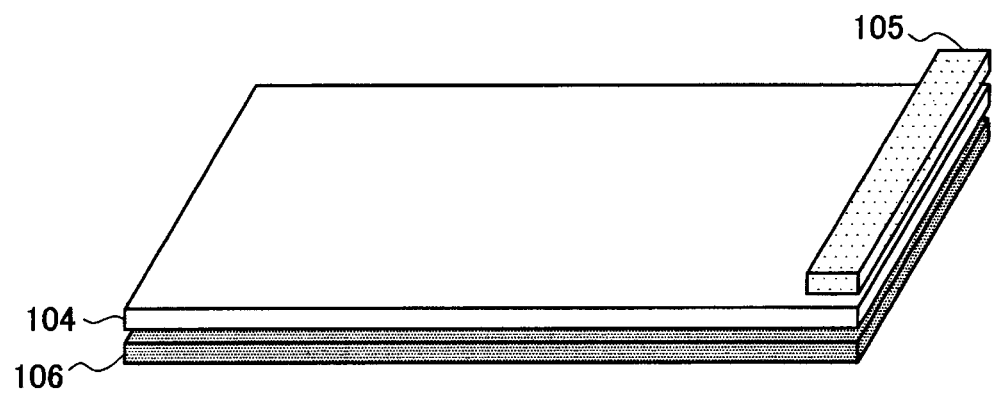
FIG. 3 is a diagram useful in showing another example of a hardware configuration of an information processing apparatus according to the same embodiment.
Figure 4:
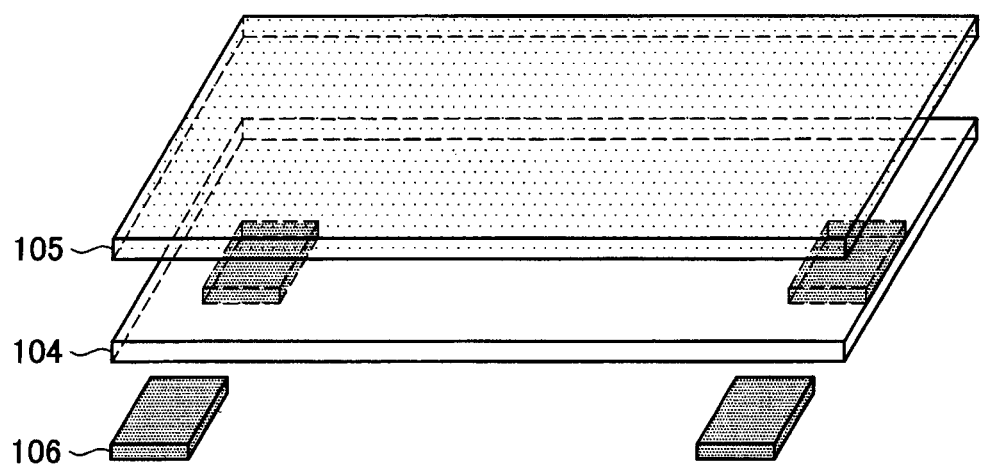
FIG. 4 is a diagram useful in showing yet another example of a hardware configuration of an information processing apparatus according to the same embodiment.

The following description is given in the order indicated below.
1. Overview of Information Processing Apparatus
2. Functional Configuration of Information Processing Apparatus
3. Operation Execution Judging Process by Information Processing Apparatus
4. Example Applications and Modifications
1. Overview of Information Processing Apparatus
Example Hardware Configuration of Information Processing Apparatus First, the hardware configuration of an information processing apparatus consistent with an embodiment of the present invention will be described with reference to FIGS. 1 to 4. FIG. 1 is a block diagram showing an example hardware configuration of an information processing apparatus 100 according to the present embodiment. FIGS. 2 to 4 are diagrams useful in showing example hardware configurations of the information processing apparatus 100 according to the present embodiment.

As shown in FIG. 1, the information processing apparatus 100 according to the present embodiment includes a CPU 101, a RAM (Random Access Memory) 102, a nonvolatile memory 103, a display apparatus (i.e., a display) 104, a touch panel 105, and a pressure sensor (i.e., a force sensor) 106.

The CPU 101 functions as an arithmetic processing apparatus and a control apparatus, and controls the overall operation of the information processing apparatus 100 in accordance with various programs. The CPU 101 may be a microprocessor. The RAM 102 temporarily stores a program being used during execution by the CPU 101 and parameters and the like that change as appropriate during such execution. The CPU 101 and the RAM 102 are interconnected by a host bus constructed of a CPU bus or the like. The nonvolatile memory (i.e., a non-transitory, computer-readable storage medium) 103 stores programs used by the CPU 101, various calculation parameters, and the like. As examples, the nonvolatile memory 103 may use a ROM (Read Only Memory) or a flash memory.

The display apparatus 104 is one example of an "output apparatus" that outputs information. As examples, it is possible to use a liquid crystal display (LCD) apparatus or an OLED (Organic Light Emitting Diode) apparatus as the display apparatus 104. The touch panel 105 is one example of an "input apparatus" that enables the user to input information, and includes an input device for inputting information and an input control circuit or the like that generates an input signal based on an input from the user and outputs the input signal to the CPU 101. Like the touch panel 105, the pressure sensor 106 is one example of an "input apparatus" that enables the user to input information.

In the information processing apparatus 100 according to the present embodiment, the touch panel 105 and the pressure sensor 106 are disposed so as to be physically separated. For example, as shown in FIG. 2, the touch panel 105 and the pressure sensor 106 can be provided opposite one another with the display apparatus 104 in between. Also, as shown for example in FIG. 3, the touch panel 105 may be provided on one part of a display screen of the display apparatus 104 and may be provided opposite the pressure sensor 106 with the display apparatus 104 in between. Alternatively, as shown in FIG. 4, the touch panel 105 may be provided on one surface (for example, a display screen side) of the display apparatus 104 and strain gauges as the pressure sensor 106 may be provided at a plurality of positions on the other surface (for example, a rear surface side) of the display apparatus 104.

Figure 5:
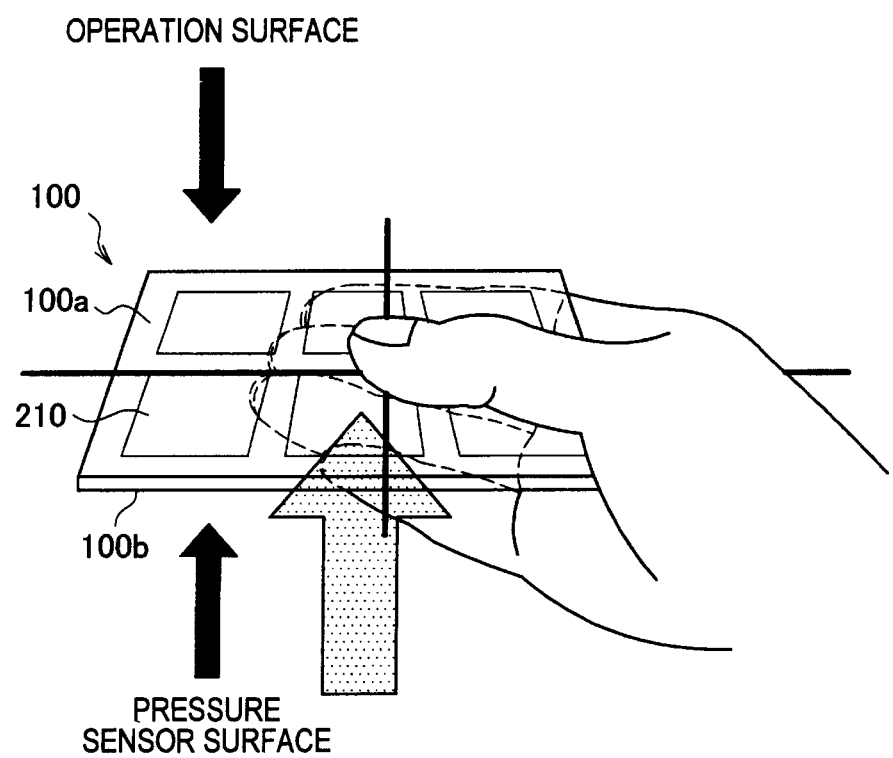
FIG. 5 is a diagram useful in showing an overview of an operation made on the information processing apparatus according to the same embodiment.
Figure 19:
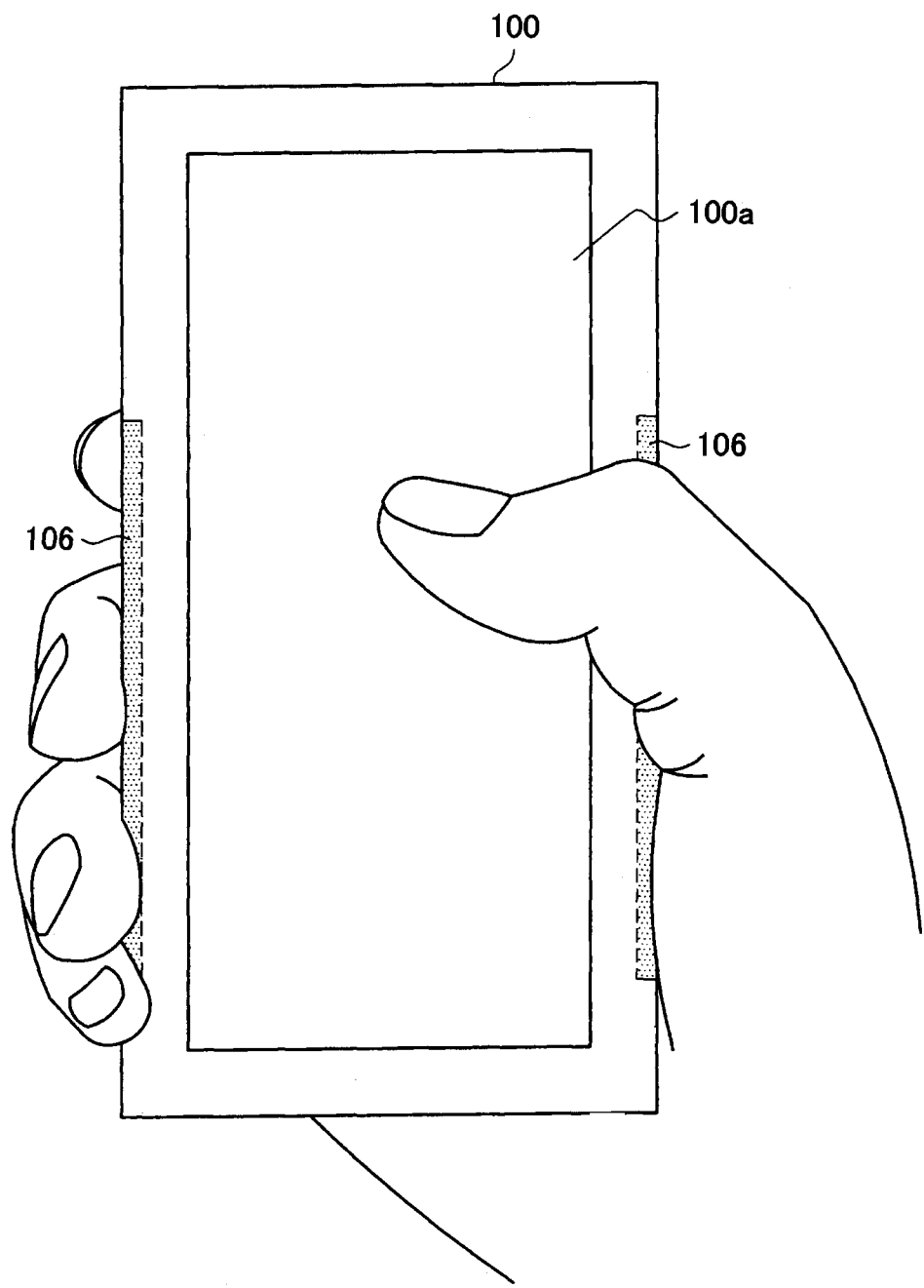
FIG. 19 is a diagram useful in showing another example layout of pressure sensors.

Note that the present invention is not limited to such examples and it is sufficient for the touch panel 105 and the pressure sensor 106 to be provided so as to be physically separated. The touch panel 105 and the pressure sensor 106 are not necessarily disposed opposite one another. For example, as shown in FIG. 19, the touch panel 105 may be provided on the display screen and the pressure sensor 106 may be provided on the side surfaces of a case of the information processing apparatus 100.
Input of Operation Information into Information Processing Apparatus By moving an input object (such as the user's finger) on the touch panel 105 and applying a load to the case, the user is capable of inputting operation information into the information processing apparatus 100 described above. Based on the inputted operation information, the information processing apparatus 100 is capable of executing various processes. For example, for a plate-shaped information processing apparatus 100 such as that shown in FIG. 5, in response to the user contacting an object 210 such as an icon displayed on a display unit to indicate a position, an operation such as deciding or selecting such indicated position is carried out based on a load detection result of the pressure sensor 106.

At such time, the pressure sensor 106 detects not the pressure applied to a display screen 100a but the load (i.e., a magnitude of a force) applied to a rear surface 100b side. That is, the pressing force that acts upon the display screen 100a is detected by the pressure sensor 106 that is provided away from the display screen 100a. This is because when the user applies pressure to the display screen 100a, a reactive force is applied to a contact surface that contacts the user's hand, a desk, or another object that supports the case of the information processing apparatus 100. By detecting this reactive force applied to the case using the pressure sensor 106, the information processing apparatus 100 is capable of estimating the magnitude of the pressure applied by the user to the display screen 100a and thereby judging whether a process is executable.

In this way, by detecting the pressure applied by the user at a position aside from the display screen 100a, it is possible to reduce the load applied to the display unit. Also, since it is possible to dispose the touch panel 105 that detects the position indicated by the input object and the pressure sensor 106 that detects the load upon the case so as to be physically separated, it is possible to avoid electrical interference between the sensors and thereby suppress the generation of noise. Even in cases where there is no space to dispose the pressure sensor 106 on an operation surface (the display screen) on which the input object is moved, since it is possible to dispose the pressure sensor 106 separately to the touch panel 105, there is increased freedom for device design.

The functional configuration of the information processing apparatus 100 according to the present embodiment and an information processing method carried out by such apparatus will now be described in detail. Note that in the following description, it is assumed that the touch panel 105 and the pressure sensor 106 are disposed as shown in FIG. 2.

2. Functional Configuration of Information Processing Apparatus

Figure 6:
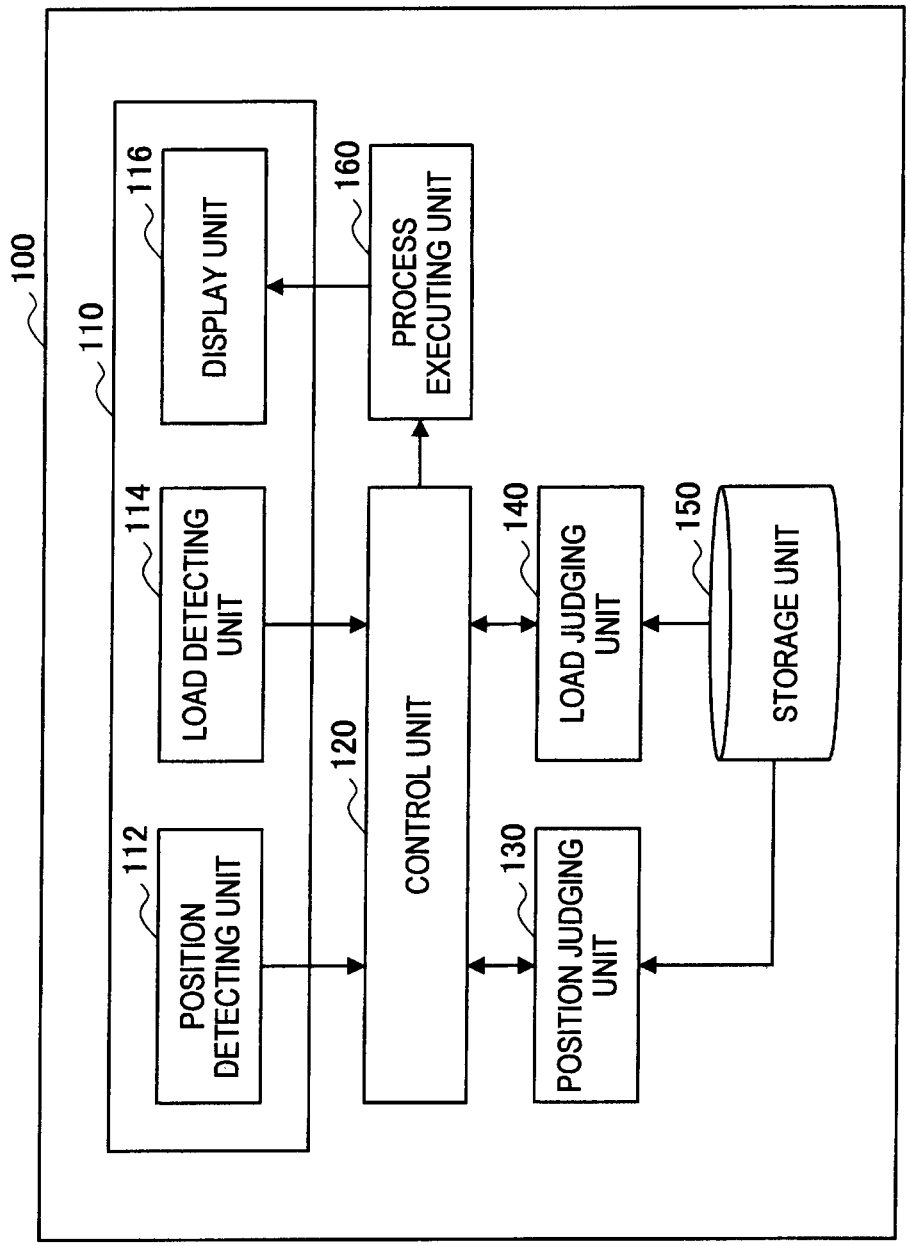
FIG. 6 is a block diagram showing the functional configuration of the information processing apparatus according to the same embodiment.

First, the functional configuration of the information processing apparatus 100 according to the present embodiment will be described with reference to FIG. 6. FIG. 6 is a block diagram showing the functional configuration of the information processing apparatus 100 according to the present embodiment. As shown in FIG. 6, the information processing apparatus 100 according to the present embodiment includes an input display unit 110, a control unit (i.e., a controller) 120, a position judging unit 130, a load judging unit 140, a storage unit 150, and a process executing unit 160.

The input display unit 110 is a functional unit for displaying information and also inputting information, and includes a position detecting unit 112, a load detecting unit 114, and a display unit 116. The position detecting unit 112 corresponds to the touch panel 105 in FIG. 1 and, as one example, it is possible to use an electrostatic touch panel. In this case, the position detecting unit 112 detects a capacitance value that changes in accordance with whether the input object has contacted the display screen of the display unit 116. Since the capacitance detected by the position detecting unit 112 increases when the input object contacts the display screen, it is possible to judge that the input object has contacted the display screen when the value of the capacitance detected by the position detecting unit 112 has exceeded a specified value. The position detecting unit 112 outputs the detected capacitance value as a detection result to the control unit 120.

The load detecting unit 114 corresponds to the pressure sensor 106 in FIG. 1 and detects the load applied to the case of the information processing apparatus 100 by an operation made by the input object. As the load detecting unit 114, it is possible to use various types of pressure sensor, such as an electrostatic, resistive, or piezoelectric sensor, or a strain gauge or the like. The load detecting unit 114 outputs an electric signal in accordance with the magnitude of the load applied to the case as a detection result to the control unit 120. The display unit 116 is an output apparatus that corresponds to the display apparatus 104 in FIG. 1 and displays display information in accordance with the process executed by the process executing unit 160.

The control unit 120 is a control unit that judges whether a process to be carried out by the information processing apparatus 100 is executable based on the detection results inputted from the position detecting unit 112 and the load detecting unit 114. When a capacitance value is inputted as a position detection result from the position detecting unit 112, the control unit 120 outputs such value to the position judging unit 130. The control unit 120 then has the position judging unit 130 specify whether the input object has made contact and the contact position and receives a judgment result (position detection result).

The control unit 120 outputs an electric signal showing the magnitude of the load inputted from the load detecting unit 114 to the load judging unit 140 and has the load judging unit 140 judge the magnitude of the load applied due to the operation of the input object and/or a change in the load. After receiving a judgment result of the load judging unit 140, the control unit 120 then judges, based on such judgment result and the position detection result, whether a process specified by the present operation is executable. If the process is judged to be executable, the control unit 120 then instructs the process executing unit 160 to execute the process.

Based on the detection result of the position detecting unit 112, the position judging unit 130 judges whether an input object has contacted the display screen of the display unit 116 and the contact position. When the capacitance values detected by electrostatic sensors of the position detecting unit 112 are inputted from the control unit 120, the position judging unit 130 judges whether an input object is contacting the display screen of the display unit 116. The position judging unit 130 judges that an input object has contacted the display screen when an increase in a capacitance value has exceeded a specified value. The position judging unit 130 is also capable of recognizing a contact position of the input object on the display screen from the position of an electrostatic sensor that has detected a capacitance of a specified value or above. The position judging unit 130 then outputs the judging result showing whether an input object has contacted the display screen and the contact position of the input object in the case where an input object has been judged to have made contact to the control unit 120.

Based on the detection result of the load detecting unit 114, the load judging unit 140 judges the magnitude of the load applied to the case of the information processing apparatus 100 by the operation made by the input object. In the information processing apparatus 100 according to the present embodiment, it is decided whether a process is executable based on the magnitude of the load applied to the case due to the user moving the input object on the display screen. For this reason, the load judging unit 140 judges the magnitude of the load on the case and changes in the load, with such judgment result being used by the control unit 120 to decide whether a process is executable. When doing so, the load judging unit 140 refers to the storage unit 150, compares the magnitude of the load on the case with various threshold loads, and outputs a comparison result to the control unit 120.

The storage unit 150 corresponds to the nonvolatile memory 103 in FIG. 1 and stores various setting information used when the information processing apparatus 100 according to the present embodiment judges whether a process is executable. Examples of the setting information include thresholds used to judge whether an input object has made contact, information relating to a standard position used as a standard when specifying a contact position on the display screen, and a threshold load, threshold time, and the like used when deciding whether to execute a process. Such setting information may be stored in advance in the storage unit 150 or may be set by the user and recorded in the storage unit 150.

The process executing unit 160 executes the process decided by the control unit 120. If display information of the display unit 116 is changed by the execution of the decided process, the process executing unit 160 outputs the display information to the display unit 116.

Figure 7:
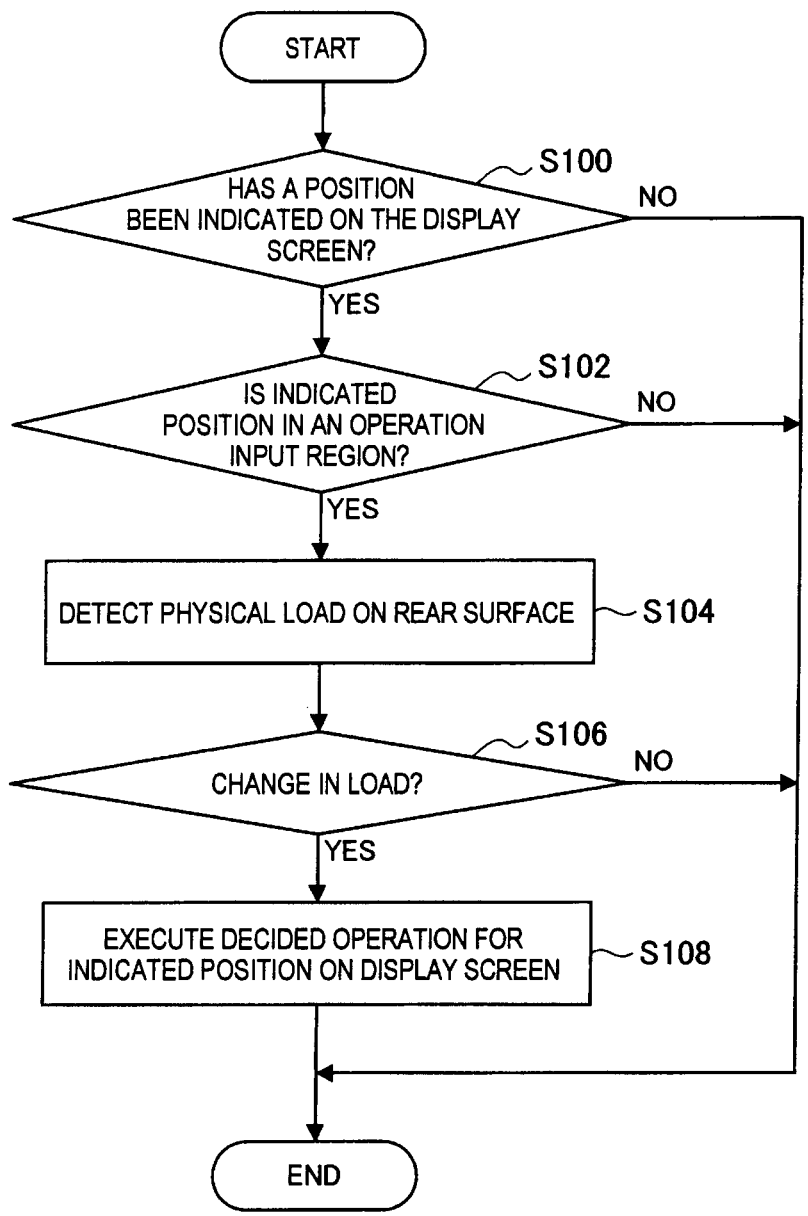
FIG. 7 is a flowchart showing an operation execution judging process carried out by the information processing apparatus based on a change in load.
Figure 8:
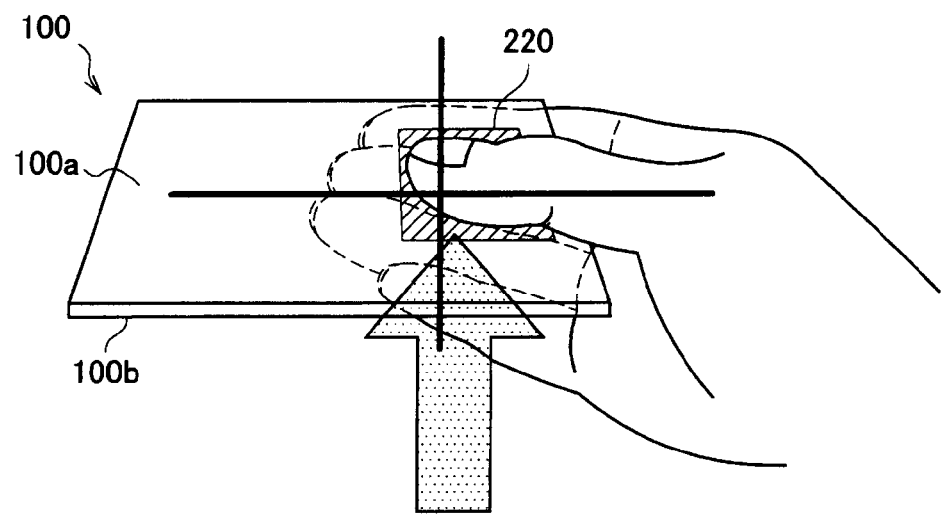
FIG. 8 is a diagram useful in showing a relationship between a contact position of an input object and an operation input region, and shows the case where the contact position is in the operation input region.
Figure 9:
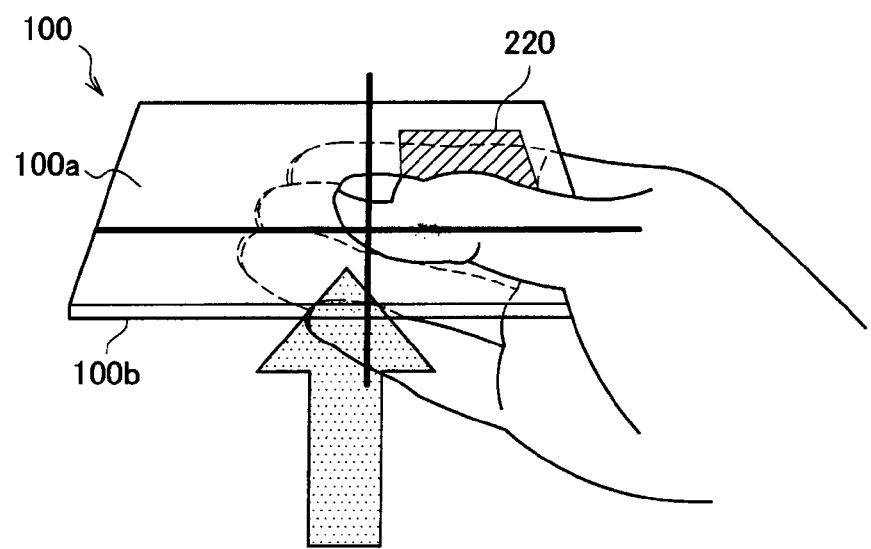
FIG. 9 is a diagram useful in showing a relationship between a contact position of the input object and an operation input region, and shows the case where the contact position is outside the operation input region.

3. Operation Execution Judging Process by Information Processing Apparatus 3-1. Operation Execution Judging Process Based on Change in Load When the user has touched (contacted) the display screen with an input object (in this example, the user's finger), the information processing apparatus 100 according to the present embodiment judges whether a process associated with the contact position is executable based on the load detection result produced by the load detecting unit 114. First, a basic version of the operation execution judging process carried out by the information processing apparatus 100 based on a change in load will be described with reference to FIGS. 7 to 9. FIG. 7 is a flowchart showing the operation execution judging process carried out by the information processing apparatus 100 based on a change in load. FIGS. 8 and 9 are diagrams useful in showing the relationship between the contact position of the input object and an operation input region.

The operation execution judging process carried out by the information processing apparatus 100 starts by judging whether a position is being indicated on the display screen by an input object (step S100). A position detection result produced by the position detecting unit 112 of the information processing apparatus 100 is outputted to the control unit 120 at specified timing (for example, a sampling period of the position detecting unit 112) and the position judging unit 130 judges based on the position detection result whether the display screen has been contacted.

For example, when the position detecting unit 112 outputs a capacitance value as a position detection result, the position judging unit 130 compares the capacitance value and a capacitance value (contact judging threshold) when an input object has contacted the display screen. If the detected capacitance value is equal to or above the contact judging threshold, the position judging unit 130 judges that an input object has contacted the display screen and the processing proceeds to step S102. Meanwhile, if the detected capacitance value is below the contact judging threshold, the position judging unit 130 judges that the input object is not contacting the display screen and the present process ends. The processing then commences again from step S100.

When it has been judged that the input object has contacted the display screen, the position judging unit 130 judges whether the contact position of the input object, that is, the position indicated by the input object is an operation input region (step S102). The expression "operation input region" refers to a region where the operation information inputted by the user making an operation with the input object is valid, with the execution of a process based on the operation information being possible only when the indicated position is present in an operation input region. An operation input region can be set in accordance with the display information. As one example, when a display region of an object 210 such as an icon is set as the operation input region, the subsequent processing is carried out only if the position indicated by the input object is present in the display region of the object 210.

As one example, when an operation input region 220 has been set as shown in FIG. 8, if the position indicated by the user's finger used as the input object is in the operation input region 220, the control unit 120 judges that the processing in step S104 onwards is executable. Meanwhile, as shown in FIG. 9, if the position indicated by the user's finger used as the input object is outside the operation input region 220, the operation information inputted from the user is ignored and the processing ends without the control unit 120 judging whether a process is executable. By setting an operation input region, it is possible to correctly carry out a process in accordance with the position indicated by the input object and thereby prevent erroneous operations.

If the position indicated by the input object is present in the operation input region 220, the control unit 120 acquires the load detection result from the load detecting unit 114 (step S104). In step S104, the load detected by the load detecting unit 114 is the reactive force that acts upon a part of the case aside from the display screen due to the user making an operation with the input object. In the present embodiment, since the load detecting unit 114 is provided on the rear surface side of the case that is the surface on the opposite side to the display screen, the load detecting unit 114 detects the load applied to the rear surface of the case from the user's hand or an object that supports the case of the information processing apparatus 100.

After this, the control unit 120 detects a change in the load detected by the load detecting unit 114 (step S106). On detecting a change in load that is equal to or greater than a specified value, the control unit 120 decides to execute an operation process in accordance with the indicated position on the display screen contacted by the input object (step S108). Meanwhile, if there has been no change in load that is equal to or above the specified value during a specified period, the present process ends without the control unit 120 executing an operation process based on the indicated position.

This completes the description of the operation execution judging process by the information processing apparatus 100 according to the present embodiment based on a change in load. According to this process, a judgment of whether to execute an operation process carried out based on the position indicated by the input object is made in accordance with the change in the load applied to a position aside from the display screen. In this way, by judging whether processing is executable based on a combination of the position detection result produced by the position detecting unit 112 and the load detection result produced by the load detecting unit 114, it is possible to judge whether the user has made a pressing operation without a large load being applied on the display screen and judge whether a process is executable.

3-2 Feedback Process for Change in Load

Figure 10:
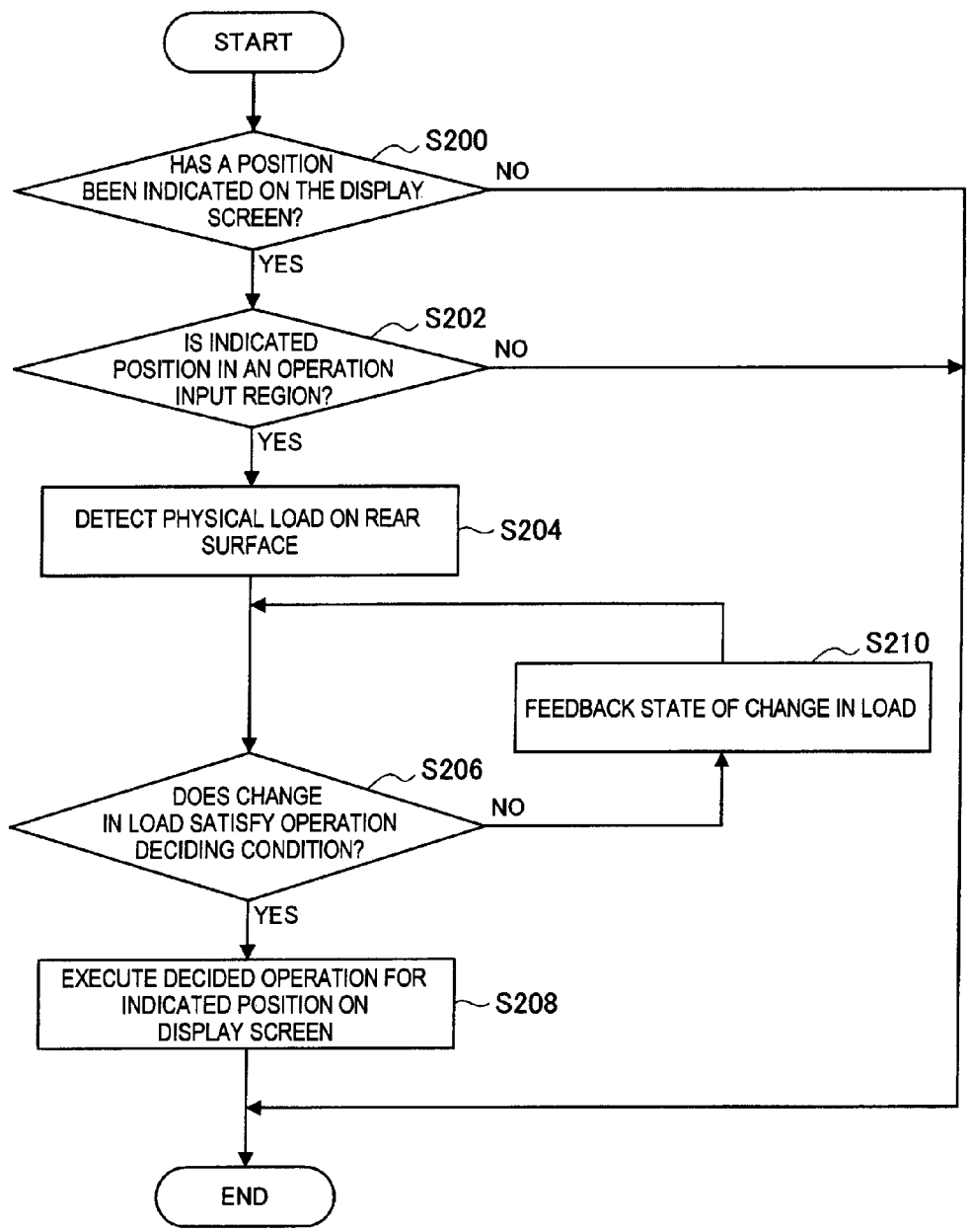
FIG. 10 is a flowchart showing a case where a process that feeds back a state of a change in load to the user is also carried out during the operation execution judging process based on the change in load.
Figure 11:
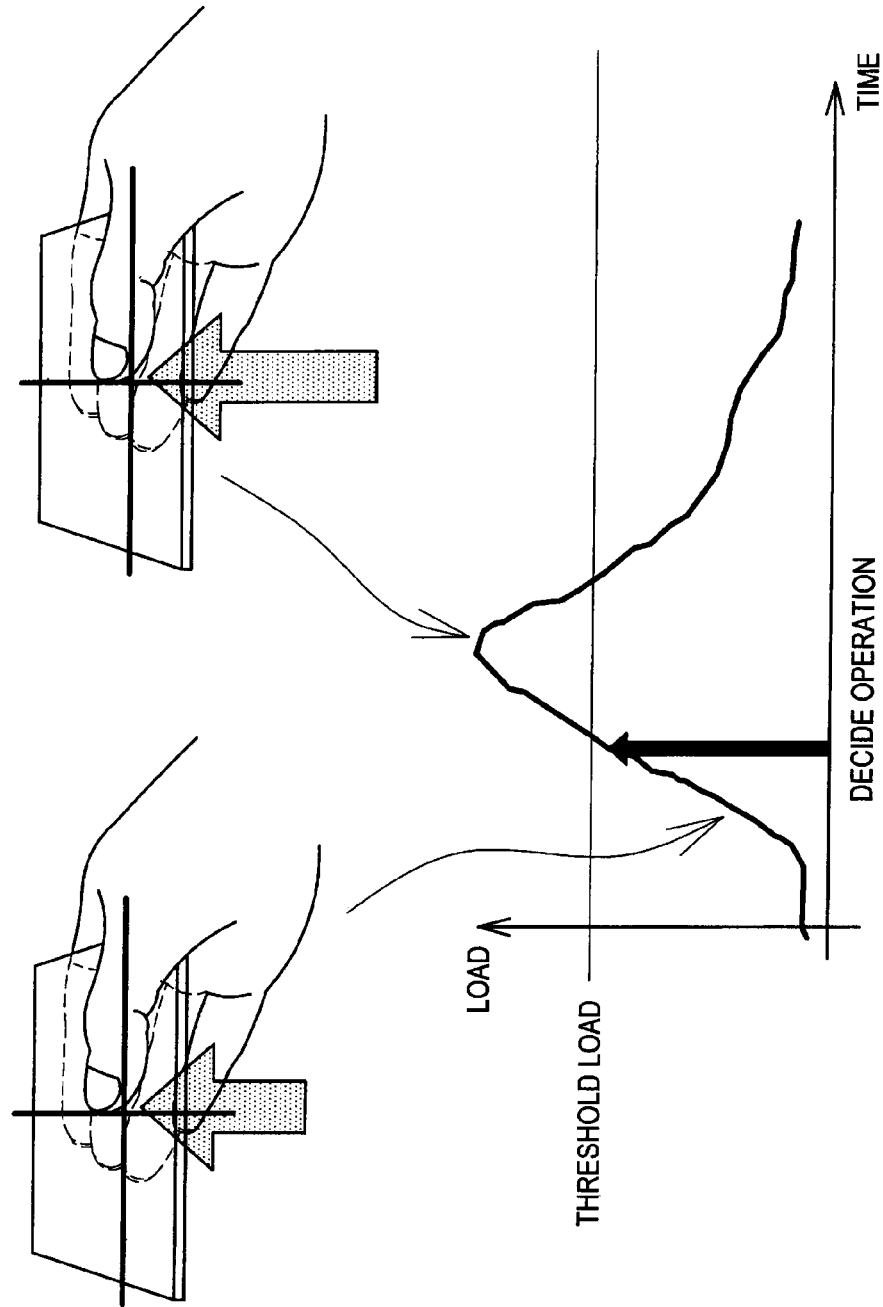
FIG. 11 is a diagram useful in showing a method of deciding whether to execute an operation process based on a change in load.
Figure 12:
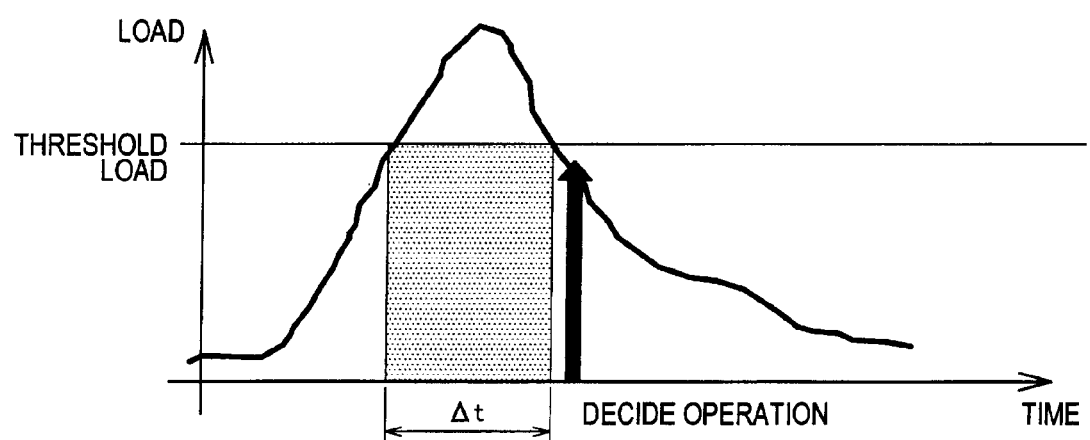
FIG. 12 is a diagram useful in showing a method of deciding whether to execute an operation process based on a change in load and a load time.
Figure 13:
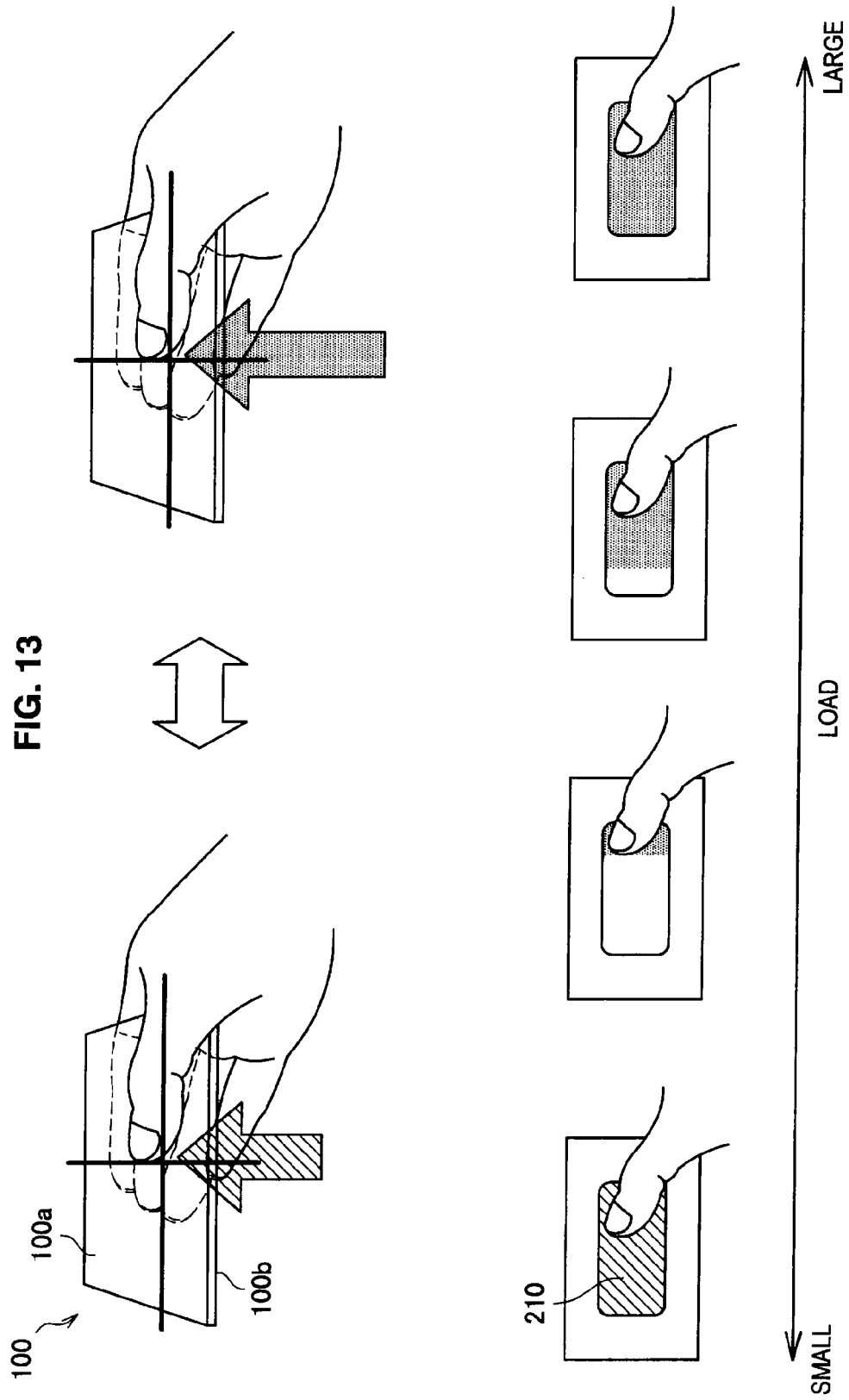
FIG. 13 is a diagram useful in showing an example method of feeding back the state of the change in load.

Next, a process that feeds back the state of the change in load to the user during the operation execution judging process based on the change in load described in section 3-1 above will now be described in accordance with FIGS. 10 to 13. In this way, by feeding back the state of the change in load to the user, it is possible for the user to recognize the extent to which the display screen is currently being pressed, what additional amount of pressing will result in processing being executed, and the like, which improves operability. FIG. 10 is a flowchart showing the processing in a case where a process that feeds back the state of the change in load to the user is additionally carried out in the operation execution judging process based on the change in load. FIG. 11 is a diagram useful in showing the method of deciding whether to execute an operation process based on a change in load. FIG. 12 is a diagram useful in showing the method of deciding whether to execute an operation process based on a change in load and a load time. FIG. 13 is a diagram useful in showing one example of a method of feeding back a state of the change in load.

In the same way as the operation execution judging process based on the change in load described above in section 3.1, the processing of the information processing apparatus 100 in this example is commenced by first judging whether a position on the display screen is being indicated by an input object (step S200). The position detection result produced by the position detecting unit 112 of the information processing apparatus 100 is outputted at specified timing to the control unit 120 and the position judging unit 130 judges whether the display screen has been contacted based on the position detection result. Here, it is possible to judge whether contact has been made by comparing capacitance values with a capacitance judgment value.

If a detected capacitance value is equal to or above a contact judgment threshold, the position judging unit 130 judges that the input object has contacted the display screen and the processing proceeds to step S202. Meanwhile, if the detected capacitance values are below the contact judgment threshold, the position judging unit 130 judges that the input object has not contacted the display screen and the present process ends. After this, processing commences again from step S200.

On judging that the input object has contacted the display screen, the position judging unit 130 judges whether the contact position of the input object, that is, the position indicated by the input object, is in an operation input region (step S202). If the position indicated by the input object is present in an operation input region 220, the control unit 120 acquires the load detection result from the load detecting unit 114 (step S204). In the present embodiment, since the load detecting unit 114 is provided on the rear surface side of the case that is the surface on the opposite side to the display screen, in step S204, the load detecting unit 114 detects the load applied to the rear surface of the case of the information processing apparatus 100 from the user's hand or an object that supports the case. Meanwhile, if the position indicated by the input object is outside the operation input region 220, the operation information inputted from the user is ignored and the present process ends without the control unit 120 judging whether to execute a process.

Note that the processing in steps S200 to S204 can be carried out by the same processing as steps S100 to S104 in FIG. 7.

The control unit 120 then judges whether the change in the load acquired in step S204 satisfies an operation deciding condition for deciding to execute a process based on the position indicated by the input object (step S206). As the operation deciding condition, it is possible to set a condition such as judging whether the magnitude of the load exceeds a specified threshold load or judging whether the time for which the threshold load is exceeded is equal to or within a predetermined threshold time. The operation deciding condition may be set in advance or may be set by the user.

For example, consider a case where an operation process is carried out when the user has pressed the display screen. Here, as shown in FIG. 11, the load applied to the rear surface side of the case increases in accordance with the user pressing the display screen. By doing so, it is possible to set an operation deciding condition whereby the control unit 120 decides to carry out an operation process if the magnitude of the load exceeds a threshold load. In a case where an operation process is carried out when an operation where the user presses the display screen and then relaxes the pressure has been carried out, as shown in FIG. 12, the load applied to the rear surface side of the case by such operation exceeds the threshold load and then changes so as to fall below the threshold load. For this reason, it is possible to set an operation deciding condition whereby if the time Δt for which the load applied to the rear surface side of the case exceeds the threshold load is equal to or within a specified threshold time, the control unit 120 decides to carry out an operation process.

If it has been judged in step S206 that the change in the load detected by the load detecting unit 114 satisfies the operation deciding condition, the control unit 120 decides to execute an operation process in accordance with the indicated position on the display screen contacted by the input object (step S208). Meanwhile, if it has been judged that the condition is not satisfied, the control unit 120 feeds back the present state of the change in load to the user (step S210).

To feed back the change in load, as shown in FIG. 13 for example, it is possible to graphically present the magnitude of the load applied to the rear surface side of the case to the user. As the presentation method, one example is a method that changes the color of the object 210 at the position indicated by the user using the input object in accordance with the magnitude of the load. When the load on the rear surface of the case is equal to or below a specified magnitude, as shown on the left in FIG. 13, the object 210 is displayed using a color (for example, blue) showing that the load is small. The same display may be used when no load is detected on the rear surface side of the case. After this, as the load increases, the size of a region with a color (for example, red) showing that a load is being applied to the rear surface increases out of the entire region of the object 210. When the load becomes equal to or above the threshold load, the entire region of the object 210 is displayed with the color showing that a load is being applied to the rear surface.

In this way, by changing the color of the object 210 in accordance with a change in the magnitude of the load, it is possible for the user to visually recognize the magnitude of the load applied by the user himself/herself. By doing so, the user is capable of recognizing the extent of the load being applied at present, the load that needs to be applied for an operation process to be executed, and the like, which makes the apparatus easy to operate. Although the change in load is fed back in FIG. 13 by changing the color of the object 210 itself that is the indicated position, the present invention is not limited to this example and it is also possible to provide a display for feeding back the change in load in a separate region to the object 210.

In step S210, the present state of the change in load is fed back to the user as described above via the display. On viewing the display, the user recognizes what operation is required to start execution of an operation process and operates the input object. As one example, in the second and third images from the left in the lower part of FIG. 13, when the display shows that an additional load needs to be applied for the execution of the operation process to commence, the user is capable of further pressing the display screen to have the operation process executed. By feeding back the state of the change in load in this way, it is also possible to prevent the user from applying an excessive load to the display screen.

After this, the control unit 120 returns to the process in step S206 to judge whether the change in load satisfies the operation deciding condition and carries out an operation process (step S208) or feeds back the state of the change in load again (step S210).

This completes the description of the case where the state of the change in load is fed back to the user in the operation execution judging process carried out by the information processing apparatus 100 according to the present embodiment based on the change in load. According to such process, it is judged based on a change in load applied to a position aside from the display screen whether an operation process to be carried out based on the position indicated by the input object is executable. In this way, by judging whether a process is executable based on a combination of the position detection result produced by the position detecting unit 112 and the load detection result produced by the load detecting unit 114, it is possible to judge a pressing operation by the user without a large load being applied to the display screen and judge whether a process is executable.

In addition, by feeding back the state of the change in load to the user, it is possible for the user to recognize the load currently being applied and what load needs to be applied to have an operation process executed. By doing so, it is possible to provide an information processing apparatus 100 with high operability to the user.

3.3 Extended Operation

Next, an operation execution judging process that extends the operation execution judging process based on the change in load described above in sections 3-1 and 3-2 by deciding the operation process to be carried out in accordance with a change in load, movement of the indicated position, and the like will be described with reference to FIGS. 14 and 15. In the present embodiment, a state where the user presses the display screen corresponds to a "mouse down" operation where a mouse button is pressed, and it is assumed that operations such as a mouse click, long click, hold, and drag and drop are possible. By doing so, it is possible for the user to carry out various operations. In the following description, the processing when a drag and drop operation is carried out according to a change in load and movement of the indicated position is explained.

Figure 14:
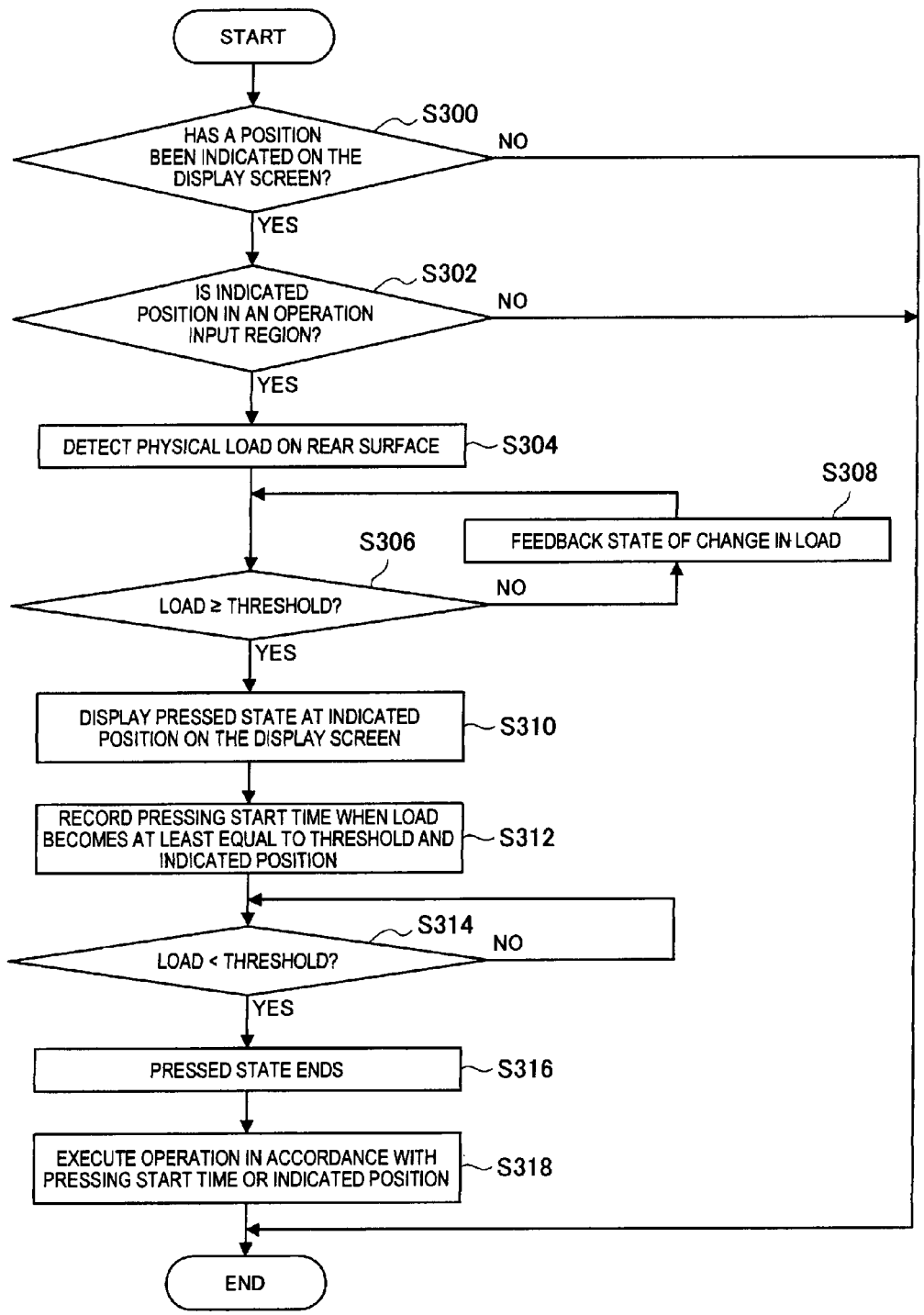

FIG. 14 is a flowchart showing the operation execution judging process carried out by the information processing apparatus 100 according to the present embodiment to decide the operation process to be executed in accordance with the way in which the load is applied, movement of the indicated position, and the like. FIG. 15 is a diagram useful in explaining the operation process carried out in accordance with the way in which the load is applied, movement of the indicated position, and the like.

In the same way as in the operation execution judging process carried out based on the change in load described above in section 3-1, the processing by the information processing apparatus 100 in the present example commences after judging whether a position on the display screen is being indicated by the input object (step S300). The position detection result by the position detecting unit 112 of the information processing apparatus 100 is outputted at specified timing to the control unit 120 and the position judging unit 130 judges whether the display screen has been contacted based on the position detection result. Here, as described above, it is possible to judge whether contact has been made by comparing capacitance values with a capacitance judgment value.

If a detected capacitance value is equal to or above a contact judgment threshold, the position judging unit 130 judges that an input object has contacted the display screen and the processing proceeds to step S302. Meanwhile, if the detected capacitance values are below the contact judgment threshold, the position judging unit 130 judges that the input object has not contacted the display screen and the present process ends. After this, the processing commences again from step S300.

On judging that the input object has contacted the display screen, the position judging unit 130 judges whether the contact position of the input object, that is the position indicated by the input object is in an operation input region (step S302). If the position indicated by the input object is present in an operation input region 220, the control unit 120 acquires the load detection result from the load detecting unit 114 (step S304). In the present embodiment, since the load detecting unit 114 is provided on the rear surface side of the case that is the surface on the opposite side to the display screen, in step S304, the load detecting unit 114 detects the load applied to the rear surface of the case from the user's hand or an object that supports the case of the information processing apparatus 100. Meanwhile, if the position indicated by the input object is outside the operation input region 220, the operation information inputted from the user is ignored and the present process ends without the control unit 120 judging whether to execute a process.

Note that the processing in steps S300 to S304 can be carried out by the same processing as steps S100 to S104 in FIG. 7.

The control unit 120 then judges whether the load acquired in step S304 is equal to or above a specified threshold load (step S306). In the present embodiment, a drag and drop operation is carried out based on a change in load and/or movement of the indicated position. For this reason, first, when the load on the rear surface of the case, which is produced by the input object pressing down the object 210 that is to be moved, becomes equal to or above a specified threshold load, the control unit 120 selects and holds the object 210. That is, it is possible to set the load detected by the load detecting unit 114 being equal to or above the threshold load as an operation deciding condition for holding the object 210.

In step S306, when the load detected by the load detecting unit 114 is below the threshold load, the control unit 120 feeds back the present state of the change in load to the user (step S308). The feeding back of the change in load may be carried out in the same way as the processing in step S301 in section 3-2 described above, and as one example, it is possible to feed back the state of the change in load by graphically presenting the magnitude of the load applied to the rear surface side of the case to the user. After this, the control unit 120 returns to the processing in step S306 and judges whether the change in load satisfies the operation deciding condition.

If it has been judged in step S306 that the change in load detected by the load detecting unit 114 is equal to or above the threshold load, the control unit 120 judges that a pressing operation with the input object has been carried out at the indicated position on the display screen and displays an indication of a pressed state on the display unit 116 (step S310). As shown in FIG. 13 for example, it is possible to display an indication of a pressed state by setting the color of the object 210 that is being operated at a color showing the pressed state, or by using a display (characters, a mark, or the like) showing the pressed state. Alternatively, it is possible to inform the user of the pressed state using sound or light.

After this, the control unit 120 stores the pressing start time when the load became equal to or above the threshold load and the position (or "standard position") indicated by the input object in a memory, not shown (step S312). Such information is used to decide which operation process is to be executed. The control unit 120 next acquires the load detection result produced by the load detecting unit 114 and monitors the time when the load falls below the load threshold (step S314).

Figure 15:
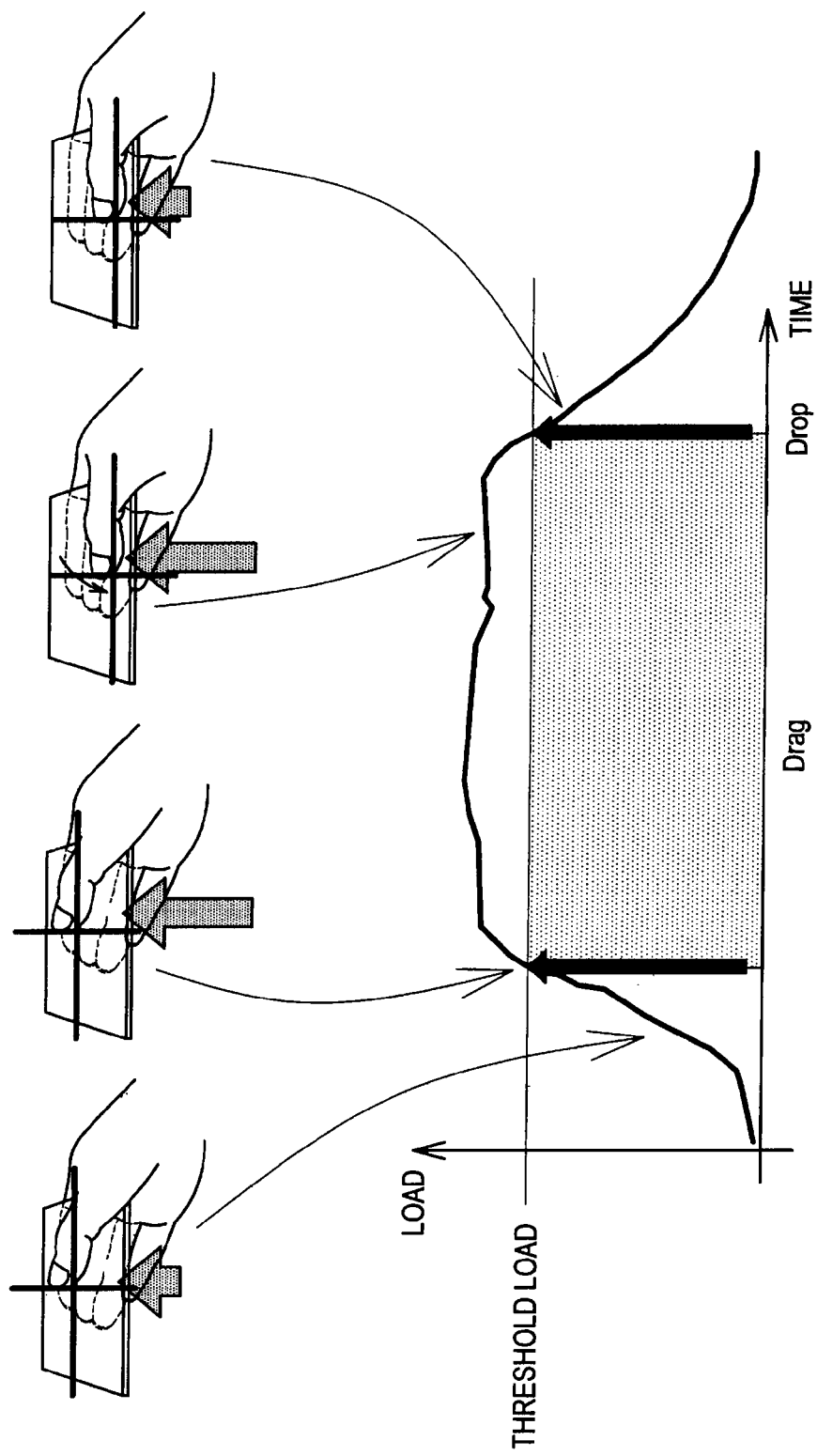

Here, if a state where the load is equal to or above the threshold load continues, as shown in FIG. 15, the control unit 120 decides to execute an operation process that drags the object 210 being held. That is, the control unit 120 acquires the position presently indicated by the input object and, based on the movement direction and the movement amount from the standard position, instructs the process executing unit 160 to move the held object 210. The process executing unit 160 carries out a display process based on the instruction of the control unit 120 and displays the object 210 so as to move on the display unit 116 in accordance with movement of the input object. While a state where the load detected by the load detecting unit 114 is equal to or above the threshold load continues, the processing described above is repeated, which makes it possible to drag the object 210 being held.

In this way, an operation that moves the input object while continuously pressing the display screen is tiring for the user. Here, in the information processing apparatus 100 according to the present embodiment, the load on the case is detected by the pressure sensor 106 (the load detecting unit 114) provided on the rear surface side of the case. The control unit 120 then treats such load as being a load on the display screen and decides whether to execute an operation process. In this way, by detecting the load applied to a position aside from the display screen instead of a load directly applied to the display screen, it is possible for the user to drag the object 210 without having to strongly press the operation surface with his/her finger.

Subsequently, when the load falls below the threshold load in step S314, the control unit 120 judges that the pressed state where the input object is pressed on the display screen has ended (step S316) and decides to execute an operation process in accordance with the pressing start time or indicated position (step S318). In this case, as shown in FIG. 15 for example, the control unit 120 decides to execute a process that drops the object 210 that was being held at the position indicated by the input object at the point when the load fell below the threshold load. By doing so, the information processing apparatus 100 according to the present embodiment is capable of realizing a drag and drop operation.

Note that the control unit 120 may decide to execute a process in accordance with whether the time from the pressing start time to a pressing end time when it was judged in step S316 that the pressed state had ended is within a threshold time. The time from the pressing start time to the pressing end time corresponds to the time Δt for which the load applied to the rear surface side of the case exceeds the threshold load. If it is judged in step S306 that the load detected by the load detecting unit 114 is equal to or above the threshold load, the object 210 at the indicated position is placed in a held state. In this state, although it is possible to move the object 210 by moving the input object in the state where the user is applying a load that is equal to or above the threshold load, it is possible to decide whether to execute a process according to whether the pressed state has continued for a specified time or longer without the object 210 being moved from the standard position.

That is, when it has been judged in step S316 that the pressed state has ended, if the movement amount by which the input object has moved from the standard position is below a specified value and the time Δt is below a threshold time, no process is executed. Meanwhile, if the movement amount by which the input object has moved from the standard position is below a specified value and the time Δt is equal to or above a threshold time, the control unit 120 decides to execute a specified process (for example, an execution process for an application) associated with the object 210 that was held. If the movement amount by which the input object has moved from the standard position is equal to or above the specified value, the control unit 120 decides to execute a drag operation as described above. In this way, by using the time of the pressed state and/or the movement amount of the input object, it is possible to execute various processes.

Based on the processing shown in FIG. 14, it is possible to decide whether to execute an operation process aside from the drag and drop operation described above. As one example, it is possible to apply the processing shown in FIG. 14 to a range selecting operation. In this case, from the position (standard position) indicated by the user object when the load detected by the load detecting unit 114 became equal or above the threshold load, the input object is moved in an arbitrary direction in a state where a load that is equal to or above the threshold load is being applied. By doing so, it is possible to set a square region that has a straight line joining the position indicated by the input object after movement and the standard position as a diagonal as a selection region that selects information displayed on the display unit 116.

When the load detected by the load detecting unit 114 falls below the threshold load, the control unit 120 then decides to execute a selection process for information included in the selection region formed by the indicated position of the input object at that time and the standard position. In this way, it is possible to apply the processing in FIG. 14 to an operation process aside from a drag and drop operation.

This completes the description of the operation execution judging process that decides the operation process executed by the information processing apparatus 100 according to the present embodiment in accordance with a change in load, movement of the indicated position, and the like. According to this process, it is judged whether to execute an operation process to be executed based on the position indicated by the input object in accordance with a change in load applied to a position aside from the display screen. In this way, by judging whether a process is executable based on a combination of the position detection result produced by the position detecting unit 112 and the load detection result produced by the load detecting unit 114, it is possible to judge a pressing operation of the user without a large load being applied to the display screen and to judge whether a process is executable.

By feeding back the state of the change in load to the user, it is possible for the user to recognize the load currently being applied to the display screen and what load needs to be applied for an operation process to be executed. By doing so, it is possible to provide an information processing apparatus 100 with high operability to the user.

In addition, by detecting the load applied to the rear surface of the case, it is possible to reduce the load applied to an input object such as the user's finger when making an operation such as moving the input object while pressing the display screen. By doing so, the user becomes able to easily carry out an operation that moves the input object while pressing the display screen. By improving the operability of the device in this way, it is possible to make a variety of operations with an input object, which makes it possible to execute a variety of processes in accordance with operations made using an input object.

Here, during the operation execution judging process described in sections 3-1 to 3-3, it is possible to generate physical feedback in accordance with the state of the load applied by the user to the rear surface side of the case. As examples, vibrations and/or sound may be used as such physical feedback. In this case, an actuator for generating vibrations and/or a sound source for generating sounds and a speaker or the like for outputting such sounds are provided. Here, one or a plurality of types of information may be fed back.

Figure 16:
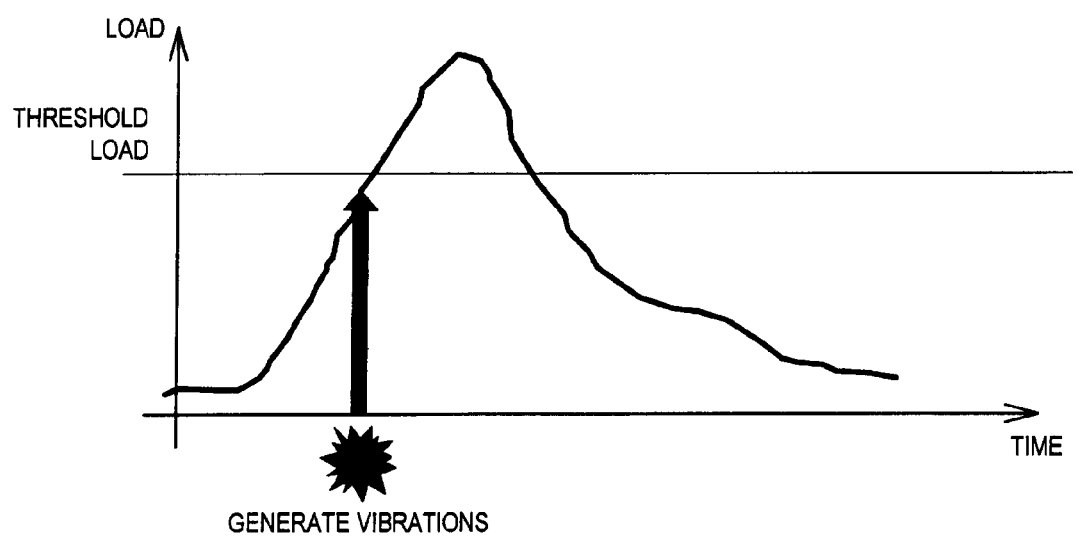
FIG. 16 is a diagram useful in showing an example of a method of providing physical feedback carried out based on execution of an operation process.

In a case where the load state is fed back using vibrations, as shown in FIG. 16 for example, the actuator may be driven to vibrate the case when the load has become equal to or above the threshold load. By doing so, it is possible for the user to recognize the start of an operation process whose execution is decided when the load becomes equal to or above the threshold load.

Figure 17:
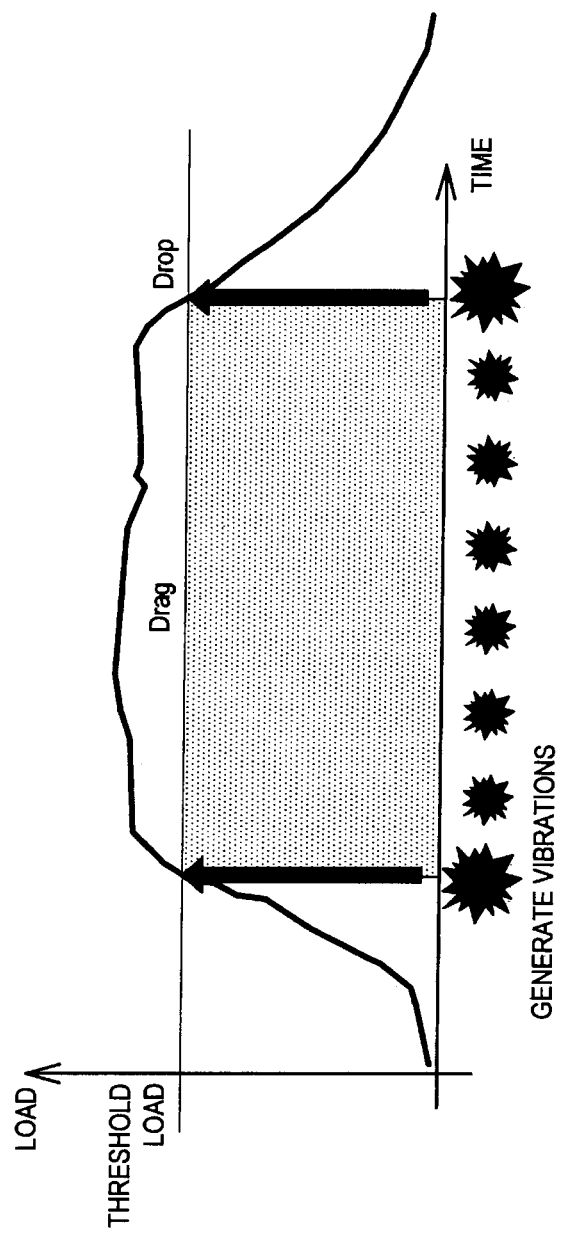
FIG. 17 is a diagram showing another example of a method of providing physical feedback carried out based on execution of an operation process.

If physical feedback is provided during the operation execution judging process for the drag and drop operation described above in section 3-3, as shown in FIG. 17, an actuator is driven to generate first vibrations when the load becomes equal to or above the threshold load. By experiencing such vibrations, the user is capable of recognizing that a drag-capable state has been reached. After this, by moving the input object in a state where a load that is equal to or above the threshold load is applied, it is possible for the user to drag an object present at the indicated position. At this time, the information processing apparatus 100 drives the actuator so as to cyclically generate second vibrations (for example, smaller vibrations than the first vibrations) of a different size to the first vibrations at predetermined intervals during the drag operation. By doing so, by applying a load that is equal to or above the threshold load, it is possible for the user to recognize that the object at the indicated position is in a drag-capable state.

After this, when the load applied to the rear surface has fallen below the threshold value, the information processing apparatus 100 drives the actuator to generate vibrations. By doing so, it is possible for the user to recognize that the drag-capable state has ended and that the object has been dropped. By making the vibrations generated when the object is dropped differ to the second vibrations generated during the drag (as one example, by generating the same vibrations as the first vibrations), it becomes possible for the user to clearly recognize that the process being executed has changed.

4. Example Applications and Modifications

Although an operation execution judging process for an operation of the object 210 such as an icon displayed on the display screen has been described above, it is also possible to apply the operation execution judging process in the same way to other operations.

Application to Onscreen Keyboard (i.e., a Virtual Keyboard)

Figure 18:
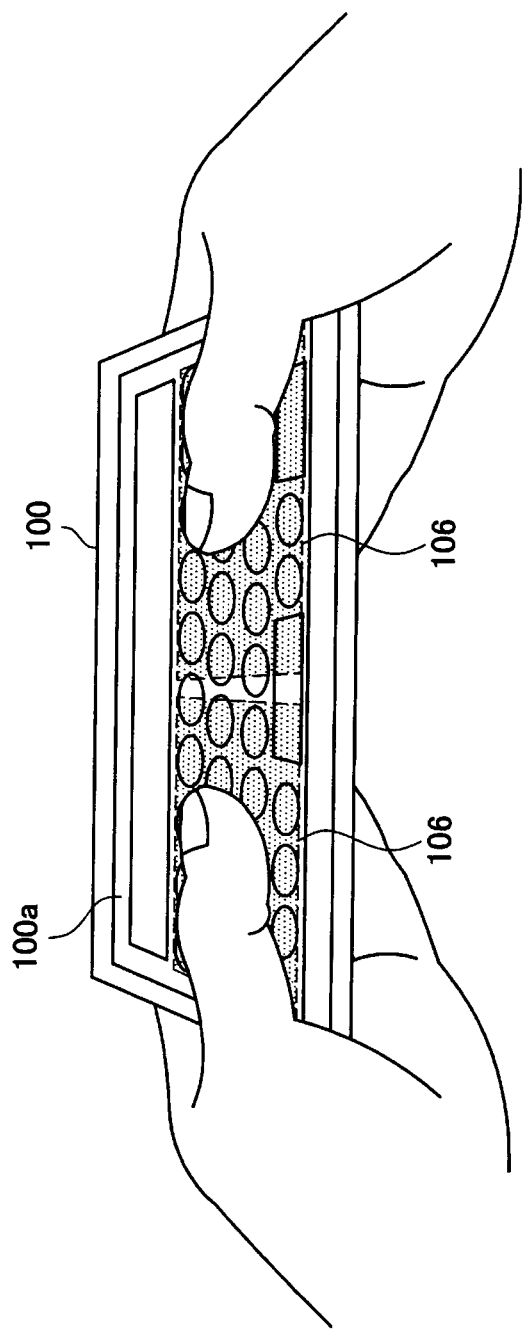
FIG. 18 is a diagram useful in explaining application of an information processing apparatus according to the same embodiment to an onscreen keyboard.

For example, as shown in FIG. 18, the operation execution judging process by the information processing apparatus 100 according to the present embodiment can also be applied to operation of an on-screen keyboard. As shown in FIG. 18, a keyboard in which a plurality of keys are laid out is displayed on the display screen 100a. By touching a displayed key and applying pressure, the user is capable of selecting a character corresponding to the key at the position contacted by the input object. After this, by relaxing the pressure applied by his/her finger, the user is capable of deciding to input the selected character.

If the user touches a position where a key is displayed with his/her finger and applies pressure to the display screen, a load is applied to the rear surface of the case from an object (such as the user's hand or a desk) that supports the case. The information processing apparatus 100 specifies a position of the selected key from the position of the finger pressing the key and when the load on the rear surface of the case in this state becomes equal to or above the threshold load, execution of an input process of the selected key is decided.

When characters are inputted using an onscreen keyboard, input is normally carried out using both hands alternately. As one example, when operating an onscreen keyboard displayed on an information processing apparatus 100 that is shaped like a plate, as shown in FIG. 18, it is possible to input characters with the thumb of the right hand and the thumb of the left hand as input objects. When doing so, even when no key is selected, in some cases the thumbs of both hands will be touching the display, so that if a load that is equal to or above the threshold value is detected by the load detecting unit 114, it will be unclear as to which character of the keys at the positions of the thumbs is to be inputted.

For this reason, the display region of the onscreen keyboard is divided into a right-hand region and a left-hand region and a pressure sensor 106 is provided for each of the regions. By doing so, since a load is detected by the pressure sensor 106 provided in the region where a pressed key is present, the control unit 120 of the information processing apparatus 100 is capable of judging whether a key is being pressed by the thumb of the right hand or by the thumb of the left hand.

In addition, if a load that is equal to or above the threshold load is detected from both the pressure sensor 106 provided in the left-hand region and the pressure sensor 106 provided in the right-hand region, it is possible to use the load detection value of the later of the pressure sensors 106 to detect a load equal to or above the threshold load. By doing so, it is possible to correctly decide the process to be executed even when a plurality of input objects are touching the display screen.

Layout of Pressure Sensors

Although the pressure sensor 106 that detects the load applied to a position aside from the display screen is provided so as to be separated from the touch panel 105 on the rear surface side of the case in the description above in order to detect the load on the rear surface of the case, the pressure sensor 106 may be provided at a different position. The pressure sensor 106 may be disposed at a position where it is easy to detect the change in load received from the user's hand that grips the case of the information processing apparatus 100 or from an object or the like that supports the case.

For example, as shown in FIG. 19, it is possible to provide the pressure sensor 106 so as to be capable of detecting a load applied to side surfaces of the case. When the user inputs an operation using his/her thumb while supporting the rear surface side of the case in the palm of the hand, the user's fingers will be positioned on the opposite side surface of the case. In this state, when the user performs an operation of grasping the case, for example, the pressure sensor 106 provided on the side surface is capable of detecting the load applied from the user's fingers.

As one example, if the user touches an object for an operation with his/her thumb and grips the case to apply a load to the case, when the detected load becomes equal to or above the threshold load, the information processing apparatus 100 is capable of executing a process associated with the selected object. In this way, in the same way as the above description, in an information processing apparatus 100 with this configuration, it is possible to decide to execute a specified process based on the indicated position detected by the touch panel 105 and the load detected by the pressure sensor 106.

Also, since it is possible to provide a plurality of pressure sensors 106, as one example it is possible to provide a plurality of pressure sensors 106 on the rear surface side of the case. With this configuration, it is possible to detect movement of the hand that supports the rear surface from changes in the load detection results of the respective pressure sensors 106. In the information processing apparatus 100 according to the present embodiment, it is possible to carry out a greater variety of operations using the acquired movements of the hand on the rear surface and the position indicated by the input object.

For example, assume that the user moves the input object on the display screen in a specified direction (for example, upward) and moves his/her hand supporting the rear surface side of the case in the opposite direction (i.e., downward) to the movement direction of the input object. Here, the detection values of the plurality of pressure sensors 106 arranged in the movement direction of the input object will increase and then decrease in order over time. From such changes in the detection values and the changes in the designated position of the input object on the display screen, it is possible to recognize the movement of the hand (i.e., gesture) mentioned above and to execute an operation process according to such gesture. As one example, it is possible to associate a high-speed scrolling process with such gesture. Compared to a normal operation process where information displayed on the display screen is scrolled by movement of the input object alone on the display screen, scrolling is carried out at higher speed than normal when both the input object and the supporting hand move. In this way, by disposing a plurality of the pressure sensors 106, it is possible to recognize a variety of operations carried out using the information processing apparatus 100 and to execute a variety of operation processes.

Although embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

For example, although two-dimensional position information is acquired by the touch panel 105 in the embodiment described above, the present invention is not limited to this. As one example, as shown in FIG. 3, it is also possible to apply the present invention to a device that has the touch panel 105 provided at one edge of the display apparatus 104 and is capable of acquiring position information in one dimension.

Also, although pressure sensors 106 are provided on only one surface composed of the rear surface of the case in the above embodiment, the present invention is not limited to this example and pressure sensors 106 may be provided on a plurality of surfaces of the case. As examples, the pressure sensors 106 may be provided on the rear surface side and the display screen side of the case or the pressure sensors 106 may be provided on the rear surface side and on the side surfaces as shown in FIG. 19. By doing so, it is possible to set a variety of conditions for deciding to execute operation processes using the load detection values acquired by the respective pressure sensors 106 and therefore possible to perform various operations.

What is claimed is:

1. An apparatus, comprising:
    a touch panel configured to detect a position of a user input by contact on the touch panel of a first part of the user's body;
    a force sensor physically separated from the touch panel and configured to detect a magnitude of a force by contact on the force sensor of a second part of the user's body that is different than the first part of the user's body;
    a controller configured to determine an operation based on the detected position and the detected magnitude of pressure; and
    a display that physically separates the force sensor from the touch panel,
    wherein the controller determines the operation based on whether the detected position is within a certain region of a display of the apparatus.

2. The apparatus of claim 1, wherein:
    the force sensor is a first force sensor;
    the apparatus includes a second force sensor; and
    the display physically separates the second force sensor from the touch panel.

3. The apparatus of claim 2, wherein:
    the magnitude of the force is a magnitude of a first force;
    the second force sensor is configured to detect a magnitude of a second force; and
    the controller is configured to determine the operation based on the detected magnitudes of the first and second forces.

4. The apparatus of claim 3, wherein the controller is configured to:
    operate the display to display a virtual keyboard; and
    determine that a key of the keyboard is pressed by the user based on the detected magnitudes of the first and second forces.

5. The apparatus of claim 3, wherein the controller is configured to determine the operation based on changes in the detected magnitudes of the first and second forces.

6. The apparatus of claim 1, wherein all of the display separates the force sensor from the touch panel.

7. The apparatus of claim 1, wherein only a portion of the display separates the force sensor from the touch panel.

8. The apparatus of claim 1, comprising a case having a surface, wherein the force sensor is situated on the outside surface of the case.

9. The apparatus of claim 8, wherein:
    the force sensor is a first force sensor;
    the apparatus includes a second force sensor;
    the outside surface is a first outside surface; and
    the second force sensor is situated on a second outside surface of the case.

10. The apparatus of claim 9, wherein the first outside surface is situated opposite the second outside surface.

11. The apparatus of claim 1, comprising a display, wherein the magnitude of the force is a magnitude of a force upon the display.

12. The apparatus of claim 1, wherein the controller determines the operation based on whether the detected magnitude exceeds a threshold magnitude.

13. The apparatus of claim 1, wherein the controller determines the operation based on an amount of time for which the detected magnitude exceeds a threshold magnitude.

14. The apparatus of claim 1, comprising a display, wherein the controller is configured to operate the display to indicate the detected magnitude.

15. The apparatus of claim 14, wherein the display indicates the detected magnitude using a color.

16. The apparatus of claim 15, wherein the controller operates the display to change the color when the detected magnitude changes.

17. The apparatus of claim 1, wherein the apparatus is at least one of a mobile telephone and a game console.

18. A method of determining an operation to be performed by an apparatus, comprising:
    detecting, with a touch panel of the apparatus, a position of a user input by contact on the touch panel of a first part of the user's body;
    detecting, with a force sensor of the apparatus that is physically separated from the touch panel, a magnitude of a force by contact on the force sensor of a second part of the user's body that is different than the first part of the user's body, wherein a display physically separates the force sensor from the touch panel; and
    determining the operation based on the detected position and the detected magnitude of pressure, wherein the determining the operation is based on whether the detected position is within a certain region of a display of the apparatus.

19. The method of claim 18, wherein the apparatus is at least one of a mobile telephone and a game console.

20. A non-transitory, computer-readable storage medium storing a program that, when executed by a processor, causes an apparatus to perform a method of determining an operation, the method comprising:
    detecting, with a touch panel of the apparatus, a position of a user input by contact on the touch panel of a first part of the user's body;
    detecting, with a force sensor of the apparatus that is physically separated from the touch panel, a magnitude of a force by contact on the force sensor of a second part of the user's body that is different than the first part of the user's body, wherein a display physically separates the force sensor from the touch panel; and
    determining the operation based on the detected position and the detected magnitude of pressure, wherein the determining the operation is based on whether the detected position is within a certain region of a display of the apparatus.

21. The non-transitory, computer-readable storage medium of claim 20, wherein the apparatus is at least one of a mobile telephone and a game console.

\* \* \* \* \*